Figure 1:
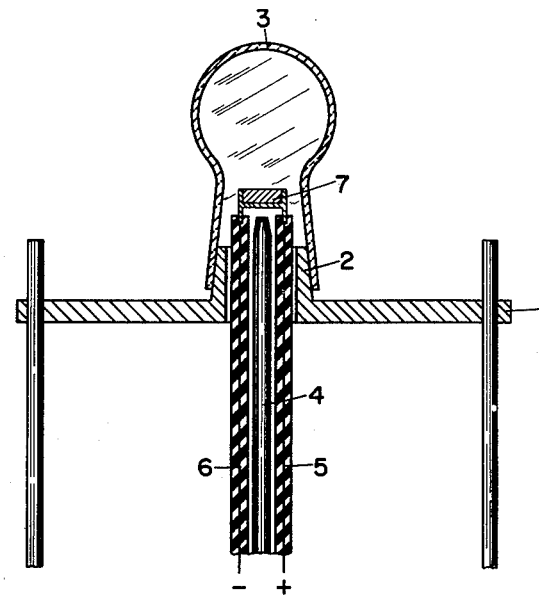

INVENTORS
GERARDUS HENDRICUS JANSSEN
PETRUS CORNELIS VAN DER LINDEN

AGENT

2,798,007
Patented July 2, 1957

2,798,007

METHOD OF APPLYING A LIGHT-DIFFUSING LAYER TO A GLASS SURFACE

Gerardus Hendricus Janssen and Petrus Cornelis van der Linden, Eindhoven, Netherlands, assignors, by mesne assignments, to North American Philips Company, Inc., New York, N. Y., a corporation of Delaware Application June 25, 1954, Serial No. 439,354

Claims priority, application Netherlands July 9, 1953

10 Claims. (Cl. 117—54)

The invention relates to a method of applying light-diffusing layers to a glass surface, for example to the inner wall of the bulb of an electric incandescent lamp, in order to prevent the filament body from shining through the bulb in a troublesome manner.

To this end use was formerly made of bulbs of opalescent glass, the price of which, however, is an obstacle in obtaining a cheap mass product. Otherwise, glass surfaces have been made light-diffusing by etching without incurring an appreciable increase in light absorption. However, etched bulbs have a limitation in that the filament body is not completely prevented from shining through the bulb.

In accordance with a further, prior suggestion the desired light diffusion was obtained by burning metals, for example magnesium, aluminium and silicon, the oxide of which has not only a strongly light-diffusing effect but also a permissible light absorption, in the interior of the bulb and by causing the smoke produced to settle on the bulb wall. However, the adhesion of these oxide layers applied by vaporisation to the glass surface proved to be insufficient for practical purposes.

By a method of frequently carried out nowadays satisfactory layers of silica are obtained by burning an organic silicon compound instead of burning silicon inside the bulb. Compared with the layers obtained by burning metals, these layers, which adhere satisfactorily to the bulb wall, cannot be conserved satisfactorily in air, so that it is necessary to rapidly convert such bulbs into incandescent lamps.

It has furthermore been suggested to improve the adhesion of light-diffusing layers obtained by burning magnesium by treating the glass surface with gaseous hydrochloric acid prior to, during or after the burning operation. This method is less attractive in view of the difficult handling of gaseous hydrochloric acid and the drastic corrosive effect of the gas.

The invention has for its object to provide in a less troublesome manner an improvement in the adhesion of magnesia layers obtained by burning the metal, which are particularly suitable for the manufacture of incandescent lamps in view of their excellent light-diffusing effect.

According to the invention a satisfactorily adhering, light-diffusing magnesia layer is obtained by exposing the glass surface to gaseous oxidation products of sulphur during or prior to the deposition of the magnesia.

The treatment with the gaseous oxidation products is carried out preferably simultaneously with the application of the magnesia since the temperatures then prevailing are sufficient to bring about the desired reaction of the oxidation products with the glass surface.

As an alternative the glass surface may be treated with the oxidation products by previously burning sulphur in a bulb. In this case, however, it is sometimes necessary to heat the glass to a temperature of more than 150° C. during this treatment or for some time after this treatment in order to obtain the reaction on the glass surface.

In a preferred method according to the invention magnesium and substances yielding oxidation products of sulphur by combustion are burnt together and caused to contact with the glass surface.

Apart from the treatment with gaseous or vaporous oxides of sulphur itself, use may be made of the combustion of sulphur or of compounds thereof, for example hydrogen sulphide, carbon disulphide and mercaptans.

The combustion of sulphur itself has a particular advantage in that, being a solid substance, it is easily added.

There is no maximum limit on the amount of the oxidation product of sulfur that may be used. However small quantities are sufficient to obtain the desired adhesion. For instance for the bulb of an incandescent lamp of 60 mms. in diameter having a surface of about 100 cms.$^2$ it suffices to burn 10 mgs. of sulphur. If sulphur compounds are used, it is necessary to have at least a quantity yielding a corresponding quantity of oxidation products.

The combustion of magnesium sulphide to carry out simultaneously the treatment of the glass surface with oxidation products of sulphur and the application by vaporisation of magnesia does not produce the result aimed at.

In the manufacture of incandescent lamps it is sometimes desirable to heat for example to a temperature of 300° C., in addition for some time after the treatment in accordance with the invention, in order to remove as much as possible remaining sulphur and volatile reaction products thereof and to prevent thus corrosion of the filament body.

Not only by burning magnesium, but also by burning alloys of magnesium with other metals, for example lithium, aluminium, silicon, copper, zinc, tin, cobalt, nickel or antimony, the magnesia may be applied to the glass surface of vaporisation. However, a sufficient combustibility requires in general that the alloy should contain apart from magnesium not more than about 10% by weight of other constituents. Use may, for example, be made of the following alloys: 90Mg–10Al, 95Mg–5Si, 95Mg–5Zn, 90Mg–5Al–5Si, 95Mg–5Ca, 80Mg–10Al–10Cu.

The quantity of Mg required for obtaining optimum light diffusion with minimum light absorption varies slightly with the area of the surface to be coated during the combustion of the magnesium. If the combustion takes place in a glass bulb of 60 mms. in diameter, about 300 mgs. of magnesium is required to obtain a layer through which the filament of the incandescent lamp does not shine. In this case the light absorption is about 20%.

In accordance with the invention use is preferably made of glass surfaces previously rendered light diffusing by etching. Thus the fact that owing to the etching an appreciable light diffusion is already obtained substantially without increase in light absorption, is usefully employed. By the combination with a comparatively thin magnesia layer according to the invention, which consequently absorbs only a small quantity of light, a light diffusion is obtained at very slight light absorption, the filament body being then no longer visible. It has thus proved to be even possible to reduce the total light absorption to 6 to 7% by burning 150 mg. of magnesium in a bulb of 60 mms. in diameter.

The magnesium or the magnesium alloy and, as the case may be, the substances producing oxidation products of sulphur by burning may be burnt in a container of quartz, tungsten, tantalum, ferrochromium or similar refractory materials. When carrying out the method the container is introduced into the bulb of the incandescent lamp and the combustion may be initiated by heating, preferably by electric ignition, for example a filament wire, a carbon arc, by high-frequency heating or, if use is made of a metal container, by passing current.

With a view to the adhesion and the light diffusion the method described above can yield layers which are at least equivalent to layers obtained by the combustion of organic silicon compounds and which exhibit sometimes even a lower light absorption. Moreover, the layers according to the invention can be better conserved in air.

The improvement in the adhesion of the layer obtained by carrying out the method according to the invention seems to be connected with the formation of sulphites and/or sulphates of alkaline and alkaline earth metals, being constituents of the glass. It has been found, for example that by carrying out the method according to the invention a quartz surface, which does not contain alkaline constituents, provided with an MgO-layer in the manner described above does not exhibit an improvement in the adhesion. A further indication of the presumed connection between the adhesion and the presence of the aforesaid salts is furnished by the fact that glass objects, subjected to combustion products of sulphur or sulphur compounds and subsequently washed in the conventional manner in order to improve the chemical resistivity of the surface, these objects having consequently a surface free from these salts, do not exhibit either an improvement in the adhesion.

The invention will now be described with reference to the accompanying drawing, which shows in sectional views two embodiments of devices which may be used in carrying out the invention.

Referring to Fig. 1, reference numeral 1 designates a stand plate provided with a protruding holder 2, in which fits a bulb 3 for an incandescent lamp. Through an aperture in the holder 2 is taken a tube 4 for the supply of oxygen and/or air for the combustion of magnesium and sulphur. This tube may, as an alternative, be used for the supply of sulphur dioxide or of other gases capable of yielding oxidation products of sulphur. Reference numerals 5 and 6 designate two insulated current supplies, on which a container 7 of tungsten is mounted. In this container, which may be heated by passing current, the magnesium and, as the case may be, the sulphur may be ignited.

Figure 2:
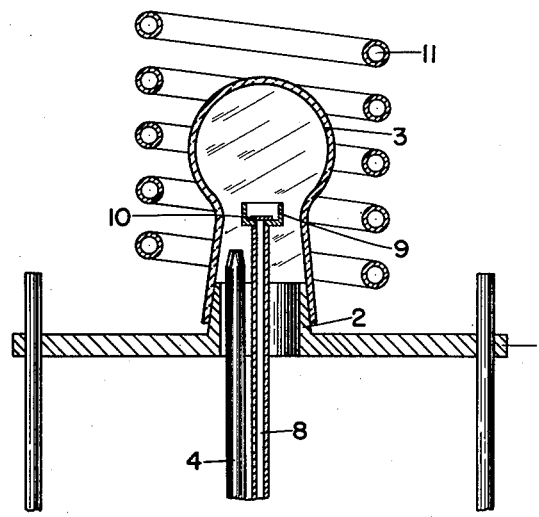

Fig. 2 shows a modification of the device; 1 designates the stand plate, 2 the holder for the bulb, 3 the bulb and 4 the supply tube for the required gases. Through the aperture in the stand plate a holder 8 is taken, on which the container 9, in this case of quartz, is mounted. In this container a ferrochromium plate 10 is provided. Reference numeral 11 finally designates a coil for the ignition of the magnesium and sulphur in the container 9 by high-frequency heating.

What is claimed is:

1. A method of applying a light-diffusing layer to a glass surface comprising the steps, contacting the glass surface with a gaseous oxidation product of sulfur obtained by burning a sulfur containing substance, and precipitating on the so-treated surface an oxide of magnesium obtained by the combustion of magnesium.

2. The method of claim 1 in which the sulfur containing substance is burnt simultaneously with the magnesium.

3. The method of claim 1 in which the sulfur containing substance is burnt prior to the combustion of the magnesium.

4. The method of claim 1 in which the sulfur containing substance is sulfur.

5. The method of claim 1 in which the magnesium is in the form of an alloy containing at least 90% by weight of magnesium.

6. The method of claim 1 in which the magnesium is in the form of the element.

7. The method of claim 1 in which the glass surface is etched prior to the application of the oxidation product of sulfur.

8. The process of claim 1 in which the surface after being coated with an oxide of magnesium is heated to a temperature of up to 300° C. to remove excess amounts of volatile sulfur containing substances.

9. A glass object having a surface treated by the process of claim 1.

10. A glass bulb the inner surface of which is treated by the process of claim 1.

References Cited in the file of this patent

UNITED STATES PATENTS

| | | |
|---|---|---|
| 2,171,227 | Schreinemachers | Aug. 29, 1939 |
| 2,253,426 | Graefe | Aug. 19, 1941 |
| 2,418,202 | Stanworth | Apr. 1, 1947 |